UNITED STATES PATENT OFFICE.

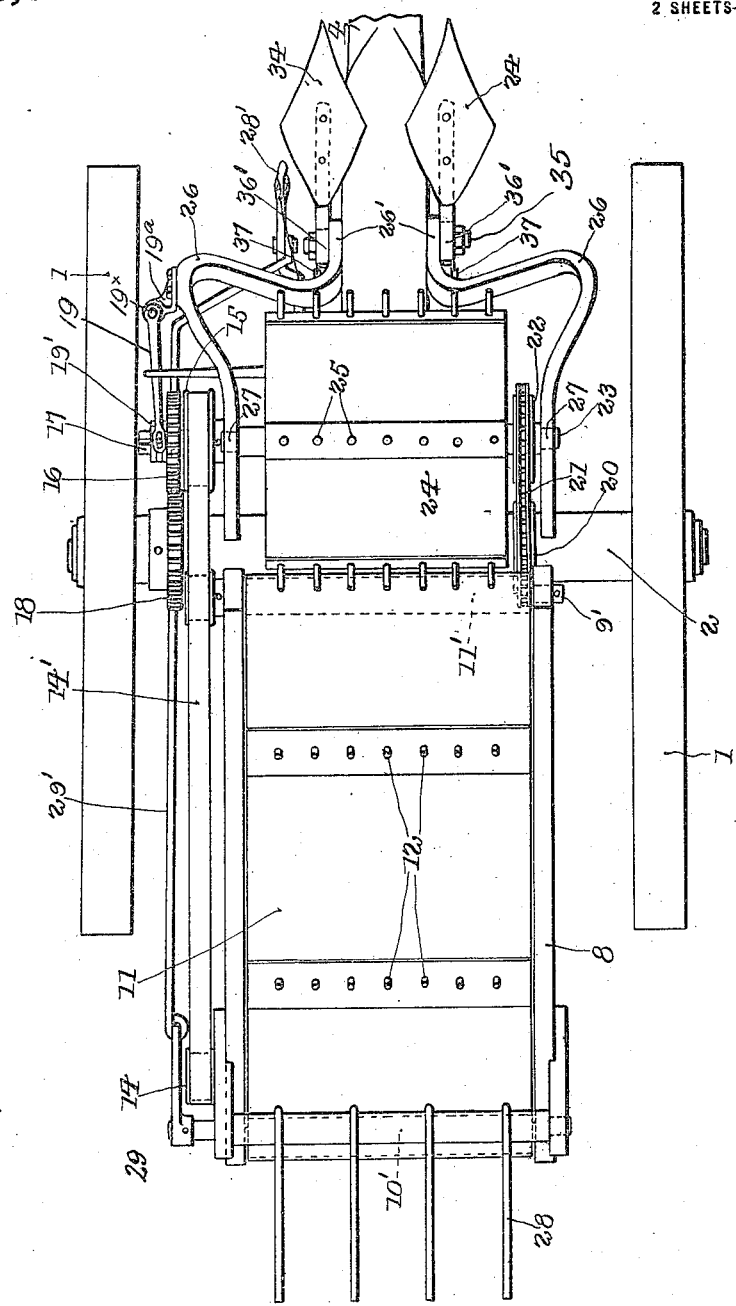

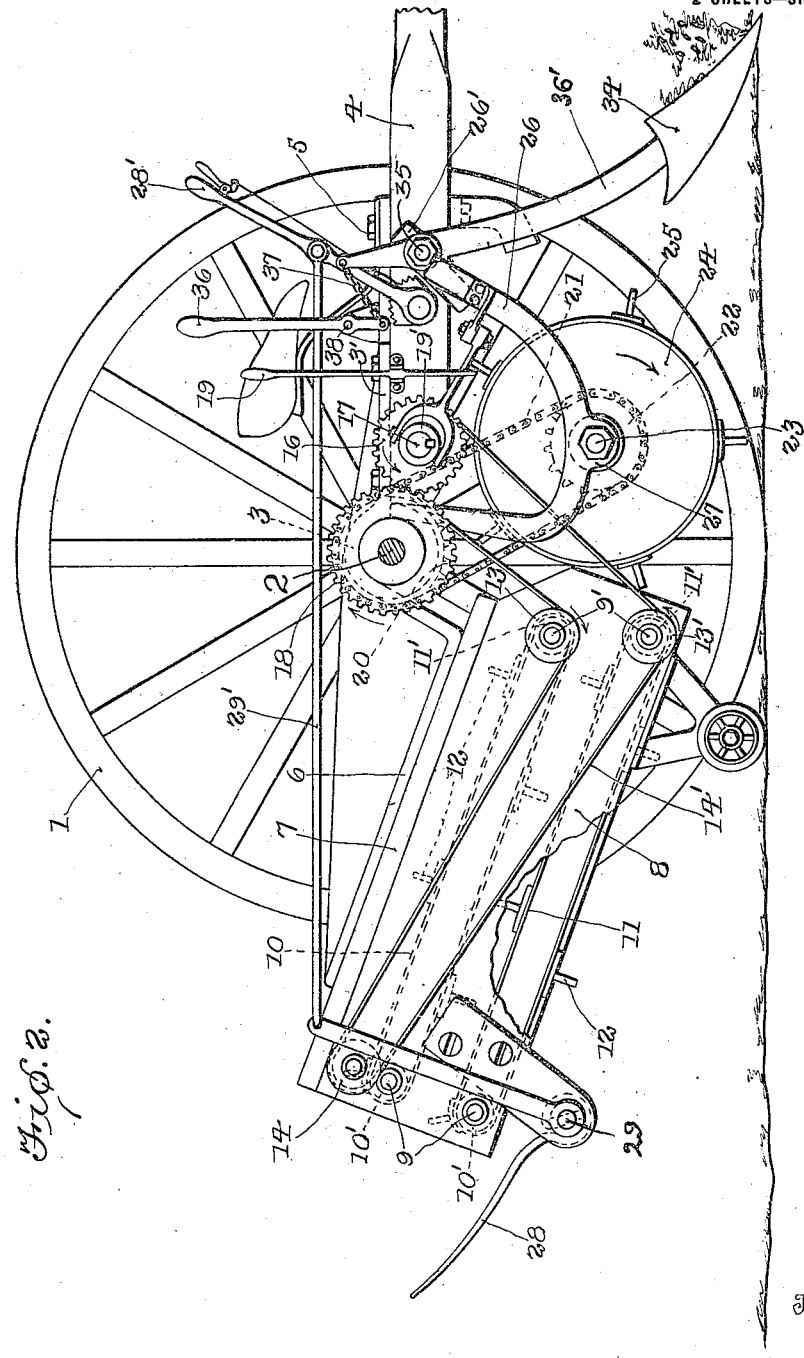

WALTER KEITH, OF STEPHENVILLE, TEXAS.

PEANUT-HARVESTER.

1,262,353.  Specification of Letters Patent.  Patented Apr. 9, 1918.

Application filed May 7, 1917. Serial No. 166,967.

*To all whom it may concern:*

Be it known that I, WALTER KEITH, a citizen of the United States, residing at Stephenville, in the county of Erath and State of Texas, have invented certain new and useful Improvements in Peanut-Harvesters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in agricultural machinery and particularly to machines for harvesting peanuts.

The primary object of the invention is to provide a device which will remove the vines from the earth and convey them to the rear of the machine where they are deposited in a carrier.

The invention comprises various details of construction, combinations and arrangements of parts which will be hereinafter fully described, shown in the accompanying drawings and then specifically defined in the appended claim.

I illustrate my invention in the accompanying drawings, in which:

Figure 1 is a bottom plan view of the harvester.

Fig. 2 is a side elevation with one of the supporting wheels removed.

Reference now being had to the details of the drawings by numeral, 1 indicates supporting wheels mounted on the axle 2. Supporting members 3 have their forward ends 3' connected to the upper side of the pole 4 by means of bolts 5, the central portions of the members 3 extending around the axle 2, while the rear ends 6 thereof are secured to the upper side 7 of the housing 8.

Connecting the sides of the housing 8 are shafts 9 and 9', supporting suitable drums 10' and 11' over which the endless conveyers 10 and 11 operate. These endless conveyers 10 and 11 are arranged in spaced relation with each other and are provided with spikes 12, arranged in such relation with each other that the spikes of one conveyer lie between the spikes of the adjacent portion of the opposed conveyer.

On one end of each of the shafts 9' are pulleys 13 and 13', while near the rear of the housing 8 an idle pulley 14 is provided. Rotary movement of the drums 10' is transmitted to the pulleys by means of an endless belt 14', operating over the pulleys 13', 14 and pulley 15, which is connected to the pinion 16 slidable on shaft 17 and adapted to be moved into engagement with pinion 18 keyed or otherwise secured to the axle 2 by means of lever 19 and clutch mechanism 19' pivoted at 19$^x$ on the bracket member 19$^a$ fastened to an outwardly curved portion of one of the supporting bars 26.

Secured to the opposite end of the shaft 2 is a pinion 20 over which operates chain 21, the chain 21 also operating over pinion 22 secured to shaft 23, which shaft supports the drum 24 which has suitable spikes 25 disposed in spaced relation around the periphery thereof. Supporting arms 26 have their forward ends secured to the pole 4 as at 26', the rear ends thereof being secured to axle 2, while the central portions thereof are apertured to form bearings 27 for said shaft 23.

A carrier 28 is supported at the rear of the housing 8 and in position to receive material from the conveyers 10 and 11, the carrier comprising suitable fingers pivoted as at 29.

Plows 34 mounted on standards 36' are disposed adjacent the forward end of the machine and are mounted to swing on the shaft 35 in order that the plows may be moved into and out of operation. The movement of plows 34 is accomplished by means of levers 36, which are connected to the respective plows 34 by chains 37, the levers 36 being supported adjacent the front of the machine and pivoted thereto at 38.

In the operation of the machine, the harvester is placed at the end of a row of peanut vines, the plows set to pass under the roots thereof and the machine is then moved along the row, with the result that the vines are removed from the earth and thrown upwardly to the drum 24 where they are engaged by the teeth thereof and passed to the endless conveyers 10 and 11, where they are carried to the rear of the machine and deposited in the carrier 28. It follows that the carrier 28 may be emptied at any desired moment or when the same has been filled by movement of lever 28', which moves the carrier through the medium of the rod 29'.

What I claim to be new is:—

In a peanut harvester in combination with an axle and wheels mounted thereon, a gear wheel rotating with the axle, supporting members supported upon the axle and having rearwardly extending angular portions, a housing mounted upon said members, bars with upwardly bent portions and having their rear ends positioned adjacent to said axle, said bars intermediate their ends provided with outwardly curved portions, a pole fastened to the forward ends of the bars, a shaft journaled in the bars, a drum rotating with said shaft, spikes secured to the drum, a stub shaft and gear wheel splined thereto, a bracket fixed to the outwardly curved portion of one of said bars, a clutch throwing lever pivotally mounted upon said bracket and designed to throw the splined gear wheel into and out of mesh with the gear upon the axle, and means for elevating vines and directing the same against said spikes.

In testimony whereof I hereunto affix my signature in the presence of two witnesses.

WALTER KEITH.

Witnesses:
R. E. HAM,
P. E. PAYNE.

Copies of this patent may be obtained for five cents each, by addressing the "Commissioner of Patents, Washington, D. C."